Oct. 2, 1934.    P. SCHMIDT    1,975,125
ARTICLE HANDLING APPARATUS
Original Filed Feb. 28, 1929    2 Sheets-Sheet 1
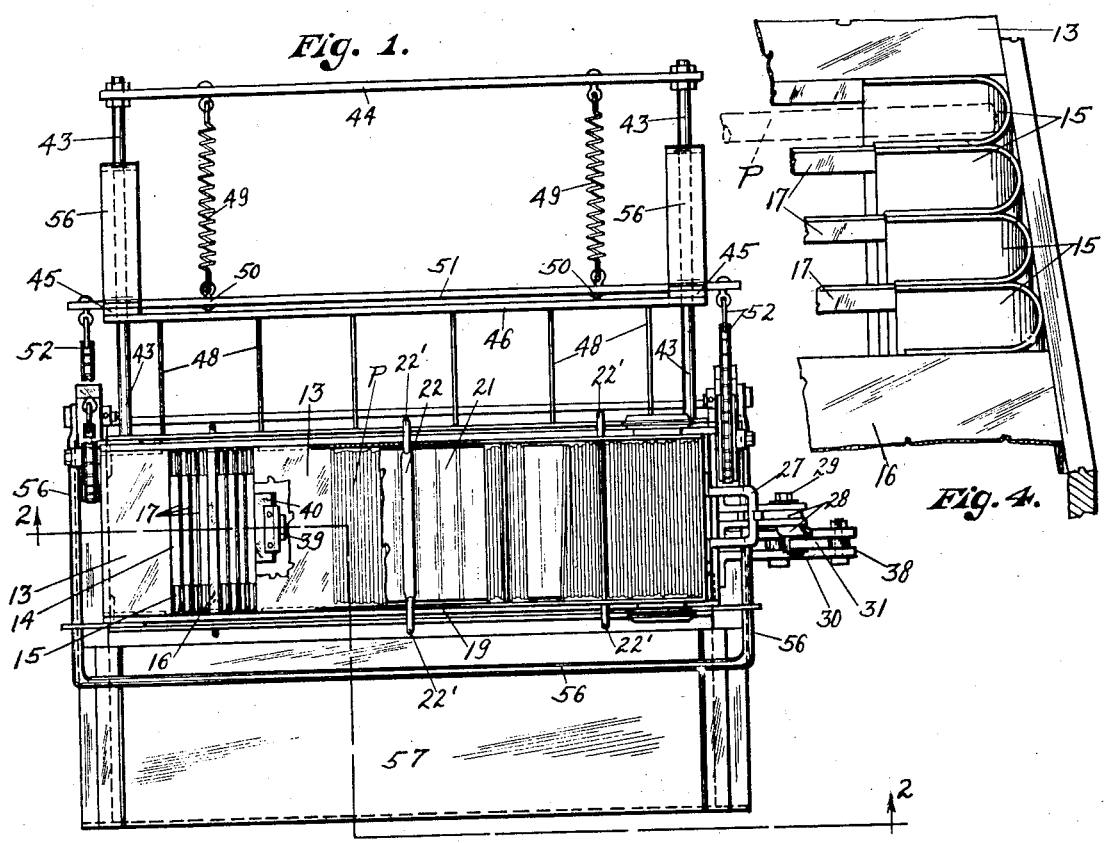
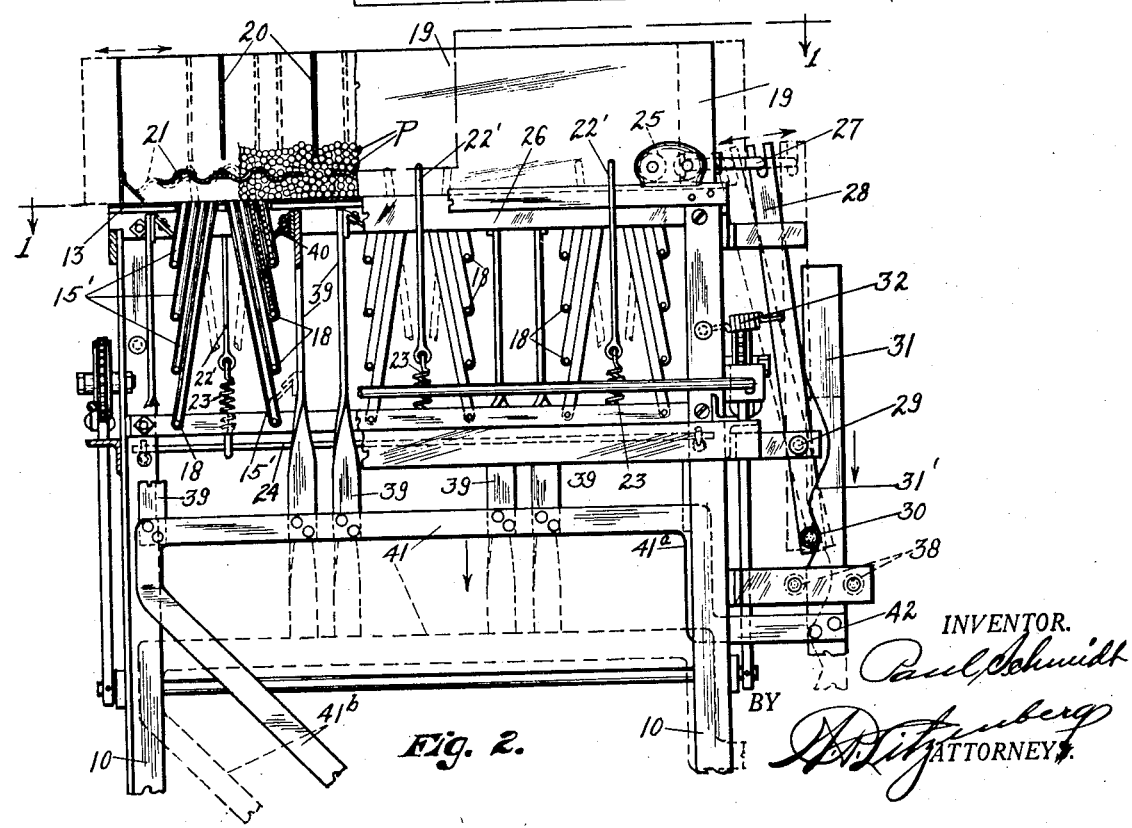

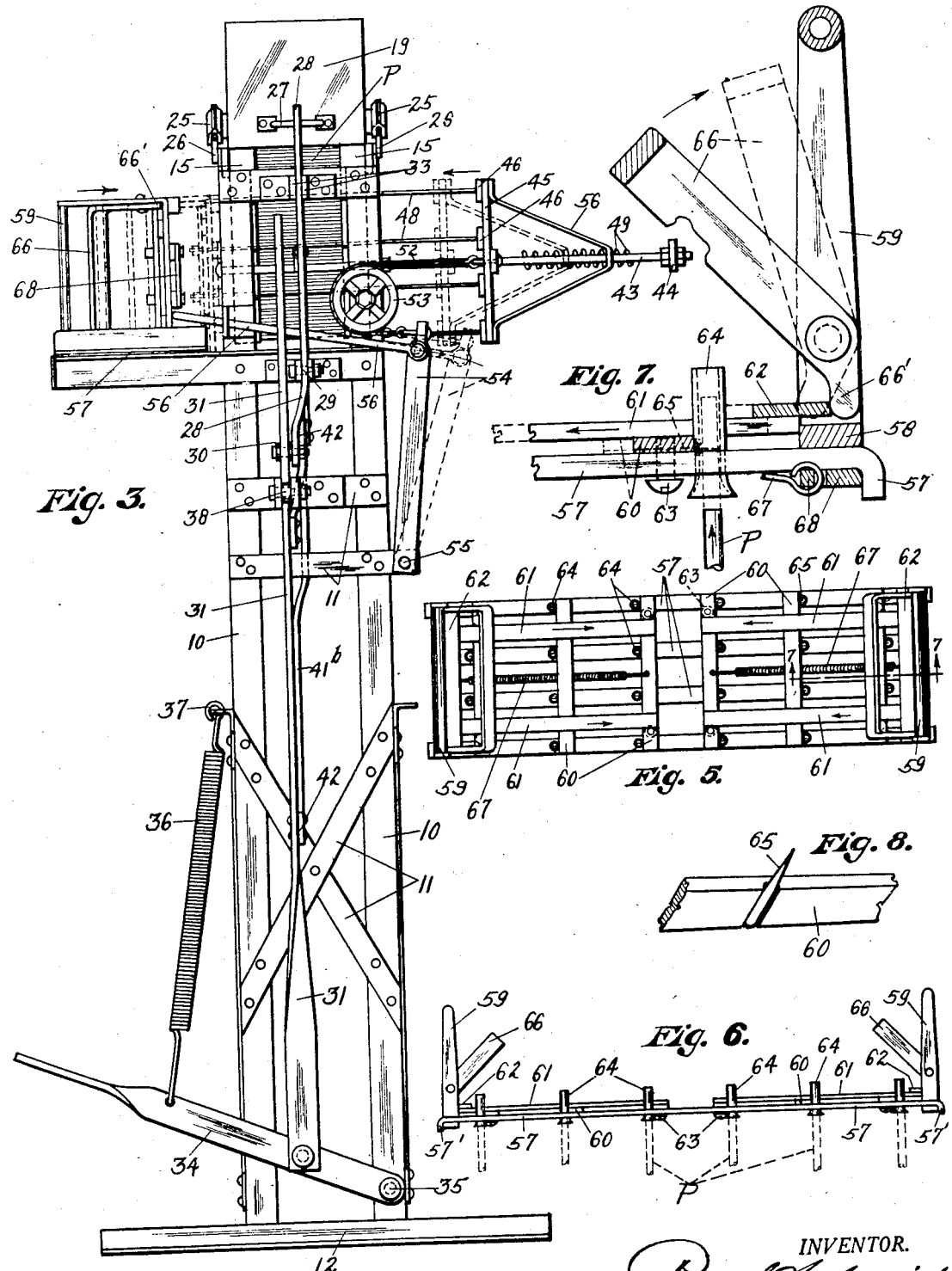

Patented Oct. 2, 1934

1,975,125

UNITED STATES PATENT OFFICE 1,975,125

ARTICLE HANDLING APPARATUS

Paul Schmidt, Pasadena, Calif., assignor, by mesne assignments, to Popsicle Service, Inc., Chicago, Ill., a corporation of Illinois Application February 28, 1929, Serial No. 343,427
Renewed March 10, 1932

7 Claims. (Cl. 107—7)

My present invention relates to means for handling articles, particularly long thin articles such for instance as wooden pins.

While the invention is capable of usefulness in many fields it finds one of its preferred embodiments in a handle stick holder and centerer adapted to be used in conjunction with the emplacement and centering of handles in multi-compartment confection molds.

The invention further specifically relates to the provision of a machine arranged to fill the stick holder.

An object of the invention is to provide a pin feeding machine capable of convenient manual pedal or automatic operation and in which the handling of the pins is positive. The possibility of the pins becoming jammed or crossed or split is reduced to a minimum and the problem of segregating individual pins from a bulk supply thereof and feeding a plurality of them simultaneously into a pin carrying device is solved in a simple and effective manner.

Another object is to provide a machine of this character capable of simultaneously delivering into a pin receiver and holder a multiplicity of rows of pins with all of the pins equidistantly spaced from each other to correspond with the centers of the mold cavities into which they are to be ultimately inserted.

Another object is to provide a machine which, in contradistinction of the type of machine which delivers only one row of pins at a time, simultaneously delivers a plurality of horizontal and vertical rows of pins with both horizontal and vertical rows equidistantly spaced from each other.

Another object is to provide a machine in which the actual pin delivery or ejection is accomplished merely by the application of the pin receiver to the pin delivery portion of the machine; more specifically an apparatus in which the pin receiver is capable of actuating the ejector mechanism for the pin feeder.

Another object of the invention is to provide an article receiver, preferably a pin or stick holder adapted to receive a plurality of pins and grip each pin by one end with the longer end of the pins protruding or pendant equidistantly beyond the receiver, whereby the handle ends of the pins are firmly held and the longer ends of the pins are free for dipping into a multi-compartment confection mould where a confection becomes bonded to them by hardening thereabout.

Another object is to provide a stick receiver and holder which will not only correctly center the pins in the various moulds but which may be used to simultaneously withdraw all of the confections from the moulds by their handles.

Another object is to provide an article receiver in which all of the articles may be simultaneously gripped or released by a simple manual operation of a control member typically a handle lever.

In accordance with a preferred embodiment of the invention the pin feeding machine includes a hopper into which a plurality of pins are dumped in side by side relationship. These pins feed into a series of sets of inclined wells, each set being so disposed that the bottoms of its wells while located at different levels are located directly under each other, the lower ends of each of the wells being equidistantly spaced from the lower ends of the adjacent wells of its own set and the corresponding wells of adjacent sets. The discharge openings from which the pins leave the machine each have an ejector associated therewith, all of the ejectors being simultaneously operable to positively push the lowermost pin from all of the wells into the waiting pin or stick receiver.

Preferably the stack of pins in each well is subjected to a slight rotary action by means of a wiper traversing the stack of pins thus being prevented from sticking together. The pins at the hopper or upper portion of the machine are also subjected to a continuous rolling agitation which tends to maintain them with their axes all parallel to each other and prevents any of the pins becoming skewed or crossed in such fashion as to block the entry of other pins into the wells. Preferably a suitable support for the pin receiver is carried by the machine and by forcing the pin holder toward the machine on this support the various ejectors are actuated through suitable linkage and operated to advance all of the pins into and through corresponding openings in the receiver to an extent predetermined by the length of the ejectors or by the arrangement of the linkage.

Preferably also the means for agitating the pins and keeping them straight and preventing them from sticking together is capable of operation independently of the ejectors so that it may be operated only as required. In accordance with one embodiment of the invention the pin agitating means may be pedally operated and the pin receiver thrust against the machine by hand so that simultaneous agitation and ejection may be accomplished if desired.

The pin receivers are in the nature of flat skeleton frames having pin receiving openings therein through which the greater length of the pins pass as they are thrust out of the machine by the ejectors. Means is provided on these thin flat frames for clamping the ends of the pins in position in the openings, the clamping being preferably effected by some mechanism which will positively penetrate or bite into the soft wooden pins and eliminate any danger of slippage.

The invention may be more fully understood from the following description in connection with the accompanying drawings wherein:—

Fig. 1 is a top plan view of a machine embodying my invention with portions broken away on the line 1—1 of Fig. 2, Fig. 2 is a front elevation of such machine with portions shown in section, taken on the line 2—2 of Fig. 1, Fig. 3 is an end elevation of the machine, Fig. 4 is an enlarged, fragmentary view of the pin holders at one end only, Fig. 5 is a back view of the holder to which the pins are fed and by which they are dipped into the moulds, Fig. 6 is an edge view thereof, Fig. 7 is an enlarged, sectional view of one end of said holder, taken on line 7—7 of Fig. 5, and Fig. 8 is a bottom perspective view of a portion of one of the members which carry grippers for holding the pins to be loaded.

Referring now in detail to the drawings, Figs. 1, 2 and 3, I will describe the machine for handling and moving the pins into positions to be received by the holder. A supporting structure composed of leg members 10, 10, with braces 11, 11, and base members, as 12, is shown in end elevation in Fig. 3, while the upper portion is shown in front elevation in Fig. 2. A top member 13, is shown with three openings 14, therein, and in these openings are pin-receiving wells having their bottoms in vertical alinement and being successively shorter. In Fig. 4 is shown an enlarged view in which the four end members 15, at one side are shown in enlarged form, indicating how the ends of the pins P are positioned therein. There are two groups of four each of said end members, 15, with division strip 16, between the groups. This will be clear from the left hand side of Fig. 1 and of Fig. 2, in which one opening 14 is shown uncovered, with the two groups of well forming end members 15, 15, shown in plan view and also in vertical sectional view, showing how the two groups of wells extend from a common horizontal top to separate bottoms in vertical alinement, said wells being designated 15'. It will be seen that there are four wells in each group and six groups, thus making twenty-four wells. Cross connecting members or bars 17 extend from one end to the other between the end members 15, 15, forming the wells to prevent the pins P from being crossed with one end in one well and the other end in another well at the surface as the pins are fed into the wells 15', 15'. The bottom portions of the end members 15, 15 are provided with openings, as 18, 18, so that the bottom pin in each well can be pushed lengthwise from the well, as hereinafter again referred to. The pins are held in the wells at their opposite ends only, their middle portions being exposed between the end members 15, 15, as seen in Fig. 3.

The pins P, usually of wood, are supplied in quantity from a container superimposed on the top member 13, and can drop down into the wells until each well is filled. A box or frame 19, is set upon the top member, with vertical partitions 20 therein extending from the top downwardly into said box, but not to the bottom thereof, as indicated in Fig. 2. Mounted in said box, lengthwise thereof, is a corrugated member 21, over each of the openings 14, 14, in the top member 13. These corrugated members rest upon the pins P, which are upon the top member 13, and are also covered with pins filling the box 19. Each corrugated plate or member is provided on top with a flattened rod 22, welded or otherwise secured thereto, with its ends extended through the opposite sides of the box 19, and bent down at opposite sides, as at 22', and provided with a spring 23, at each end, anchoring the two ends yieldingly to cross rods 24, across the frame structure. Each corrugated member is thus pivotally held in the box so that as the box is oscillated endwise in a manner hereinafter referred to, said corrugated members operate to roll the pins down into the wells and to keep them filled so that there is always one in the bottom, to register with the holes, so that it can be pushed out as hereinafter referred to. The pins roll down between the ends of the corrugated members to a position under the same as the box is oscillated.

The box is provided with rollers or wheels, as at 25, at each side and at both ends, rolling on bars or track members 26, and the box is also provided at one end with a loop member 27, by means of which it is connected to a bifurcated lever 28, pivotally mounted at 29, and at its lower end provided with a roller 30, which bears against a cam bar 31, mounted to be reciprocated vertically and operating by reason of the cam surfaces 31' thereon to intermittently move said lever 28, which is drawn back by means of a spring 32. Said lever 28 near its upper end is held between two guide members 33. The bar 31, having the cam surfaces 31' on one edge, is extended down to a foot lever 34, pivotally connected at 35 to the frame, and normally raised by means of a coiled spring 36, connected at its upper end to the frame, as at 37. The vertical cam bar 31 moves between two guide rollers at 38. Thus as the foot lever 34 is depressed, the cam bar 31 is moved downwardly, with its cam surfaces 31' operating on the lower end of the rocker lever 28, causing it to oscillate the box 19, as indicated by the dotted line position in Fig. 2 thus jostling the pins therein and causing them to seek low levels, while the corrugated members roll as one would roll his hand over them and cause them to fill into the wells 15, 15. Thus said wells are kept filled with the pins, the lowermost one being in position to be ejected endwise therefrom through the holes 18 at opposite sides of each well, at the lowermost position.

As a means for rubbing said pins intermediate their ends to prevent them from sticking, a vertical bar 39, with flexible wiper 40, is mounted at the side of each group of wells, said bars being connected at their lower ends to a movable bar or yoke 41. The bar or yoke 41 is offset, as at 41a and 41b, and is extended to and attached to the vertical cam bar 31, as at 42, and at a location down below where the figure is broken away in Fig. 2, whereby the vertical reciprocation of said cam bar 31, also moves said bar 41 and the wipers 40 operating against the stacks of pins in the wells. This is provided as an additional assurance of maintaining said pins in proper positions in the wells.

Mounted at opposite ends of the frame structure are two horizontal bars 43, 43, connected at their outer ends with a cross bar 44, said bars 43, 43, being anchored in the frame structure and constituting a support for an ejector mechanism sliding thereon and comprising two vertical bars 45, 45, one on each rod 43, with four connecting bars, as 46, with a yoke 47 for each end, forming a brace for the members 45 and 46. The cross bars 46 are provided with ejector pins 48, there being six on each bar 46, making twenty four ejector pins on the ejector mechanism. Two coiled springs 49, 49, are attached at their outer ends to the cross bar 44, and at their inner ends to the ejector frame, as at 50, an outer cross bar 51, being provided for this purpose and having its opposite ends extended slightly beyond the ends of the ejector frame and having attached thereto the ends of two operating chains, 52, 52, running around two pulleys 53, 53, with their other ends attached to levers, 54, 54, pivotally supported at their lower ends, as at 55, upon the frame structure. The upper ends of said levers 54, at the opposite sides of the frame structure have attached thereto the two ends of a yoke 56, said yoke extending around the front of the machine and resting upon a table 57, and by means of which the two levers 54 can be pushed from the full line positions, shown in Fig. 3, to the light broken line position, which movement operates through the chains and pulleys to move the ejector frame and pins forwardly into the frame, said pins being positioned to register with the twenty four holes in the bottoms of the wells which hold the wooden pins which are to be loaded from moulds, as hereinafter referred to. Thus when said yoke 56 is moved rearwardly, the ejector frame and ejector pins 48, 48, are moved forwardly through the bottoms of the wells for the purpose of ejecting the bottom pins therefrom, there being twenty-four pins i. e. four rows of six pins each and six vertical rows of four pins each ejected in equidistantly spaced positions, as represented by the bottom ends of the twenty-four wells in Fig. 2.

I will now describe the hand operated holder by means of which the yoke 56 is moved and which at the same time receives the ends of the ejected pins.

Referring to Figs. 5, 6, 7 and 8, this holder comprises a flat frame composed of four bars, designated 57, spaced laterally and secured together with cross bars 58, at their ends, the outside bars 57, being turned down at their ends, as at 57', so that when said holder is set down flatwise, said down-turned ends form corner supports. End handle members 59 are secured rigidly to the ends of said bars 57. Sliding upon the opposite ends of said parallel bars 57, are two frames composed of cross bars 60, 60, connected with two longitudinal bars 61, 61, each frame being provided on its outer end with a top cross bar or plate 62. Screws with large heads, designated 63, are screwed into the undersides of the cross bars 60, 60, with their heads underlying the long bars 57, 57, whereby to hold said frames slidingly upon said bars 57. By removing said screws, said slide frames can be removed from the body or long frame members 57. Said frame bars 57 are provided therethrough with short tubular members, 64, 64, having flaring ends to receive the pins, as hereinafter described. There are twenty-four of said receiving tubes 64 shown, corresponding to the wells and the ejector pins. The cross bars 60, 60, of the slide frames, are provided at each tube 64, with some suitable means for biting into the pins such for instance as a needle point, as 65. This is shown in enlarged view in Fig. 8, and these needle points move with said cross bars 60, 60, into and out of said tubes 64, for the purpose of penetrating and holding the wooden pins when they are inserted therein. Pivotally mounted in the end handle frames 59, 59, are rocking cam yokes 66, the ends of which are extended into cam toes, as 66', adapted to bear against the cross member 62, of the slide frame, as clearly shown in the enlarged view Fig. 7, for moving said slide frame, as indicated by the broken line position. It will be seen that as the handles 59 are gripped in the hands of the operator, he can with his fingers close the rocker yokes 66 and move them as indicated by the arrow, Fig. 7. This moves said slide frames to withdraw the needles 65 from the tubes. A coiled spring 67, is attached at one end to one of the cross bars 60 of the slide frame, and at its other end to an attaching member 68 provided on the underside of the main frame members 57.

Said hand operated holder is operated by being picked up by both end handles, and while the rocker yokes 66 are also moved to shift the slide frames to move the holding needle points withdrawn from the short tubes 64, said holding frame is placed upon the table 57, in front of the main structure, with the flared ends of the short tubes 64 toward the structure and the ends of the wells, as indicated in Fig. 3, and in this position said holding frame is pushed against the yoke 56 and it is moved to the broken line position in Fig. 3. This operates to move the ejector pins into the bottoms of the wells, eject the bottom pins which enter the flared ends of the short tubes 64, whereupon the rocker yokes 66 are released and the spring 67, returns said slide frames to their normal positions, with the needle points inserted into the short tubes 64 and into the pins P. Thus the holder has picked up twenty-four equidistantly spaced wooden pins by their ends and their free ends are projecting to predetermined uniform distances beyond the holding frame when the latter is in the position shown in Fig. 6. In this condition they can all be lowered into any suitable multiple compartment molds (not shown) containing the matter to be placed thereon by hardening, whether by cooling or freezing. The moulds per se form no part of the invention and need not be shown, as said pins can be dipped simultaneously into any kind of mould and any kind of material with which they are to be loaded.

Thus I have provided a machine in which a quantity of pins to be loaded with matter which adheres thereto can be sorted and arranged in proper relative position and from which said pins can be simultaneously ejected endwise into position to be gripped by a portable holder and held in spaced relationship while being dipped into moulds containing the matter with which said pins are to be loaded. While still gripped in the holder said pins can be simultaneously withdrawn with the solidified confections adhering to them and then all of said handled confections simultaneously dumped by releasing the grip on the pins.

While I have shown and described in detail one practical embodiment of my invention, I am aware that many changes can be made therein without departing from the spirit thereof, and I do not, therefore, limit the invention to the showing here made for descriptive purposes, except as I may be limited by the appended claims.

I claim:

1. In combination, a box to receive a quantity of wooden pins together lengthwise, one upon the other, a corrugated member therein for rolling said pins together to settle them, means below said box to receive said pins in vertical stacks, said means having outlet openings at their ends for ejecting said pins selectively therefrom endwise and in spaced relationship, means for selectively ejecting said pins endwise through said outlet openings, a holder having spaced receiving means to be placed in register with said outlet openings to receive the ends of said ejected pins, said holder having releasable means for holding and releasing said pins simultaneously, said ejecting means being operable by said holder and said holder being manually operable to operate said ejecting means.

2. In a machine of the character referred to, a box having vertical partitions from the top down into the box short of its bottom, corrugated members horizontally positioned in said box below said partitions, means for moving said box relative to said corrugated members whereby pins therein can be rolled and leveled into the bottom portion of said box, a table portion upon which said box sits, with no other bottom, wells having openings through said table portions and extended downwardly below the same with bottoms at different levels and in vertical alinement, said wells having openings for the discharge of said pins endwise therefrom, means for selectively and simultaneously discharging a series of pins in spaced relationship from said wells, a portable holder for receiving the same and for holding them by their ends in such spaced relationship, and means for releasing said ejected pins from said holder.

3. In an apparatus for handling pins to be loaded with matter at their ends, a receptacle to receive said pins in quantity one upon the other in parallel relationship, a series of vertically inclined wells below said receptacle into which said pins feed lengthwise one upon the other, the bottoms of said wells being in substantial vertical alinement one above the other and spaced vertically and horizontally, with outlet openings at the bottoms of said wells, means for discharging the bottom pins in said wells partially from said wells, and portable holder having spaced receiving openings with gripping means for simultaneously picking up all of said discharged pins by their ends in spaced relationship, said gripping means being manually operable to release said pins at will from said holder.

4. Means for sorting a plurality of similar pins and for simultaneously ejecting selected pins arranged in horizontal rows and in rows at an angle to the horizontal including a hopper, a series of wells communicating at their upper ends with said hopper and adapted to receive laterally alined pins one upon the other, said wells being inclined and of different lengths and having outlets at their lower ends from which said pins are adapted to be ejected endwise, and means for simultaneously ejecting the pins endwise through all of said outlets, the wells being arranged to conceal the ends of the pins and to expose the intermediate portions thereof and means to wipe against and effect rotation of the pins as they are feeding through the wells whereby to prevent two pins from sticking together.

5. A machine for sorting, segregating and ejecting elongated articles including a hopper into which articles in bulk and substantially in parallelism are adapted to be inserted, a plurality of wells communicating with the bottom of said hopper and into which the pins are adapter to feed one at a time whereby the stacks of pins are built up in the well, said wells having openings at their lower ends through which the pins are adapted to be ejected endwise and means to impart a rubbing and rolling motion to the pins in the hopper whereby to establish and maintain axial parallelism thereof and prevent them from skewing and blocking the mouths of the wells.

6. A machine for sorting, segregating and ejecting elongated articles including a hopper into which articles in bulk and substantially in parallelism are adapted to be inserted, a plurality of wells communicating with the bottom of said hopper and into which the pins are adapted to feed one at a time, whereby stacks of pins are built up in the well, said wells having openings at their lower ends through which the pins are adapted to be ejected endwise and a corrugated plate disposed substantially horizontal in the hopper but of less length than the length of the hopper and means for rocking the plate about an axis parallel with its ends to agitate the pins and establish and maintain parallelism thereof.

7. In apparatus of the class described, means for feeding a plurality of pins into position for endwise ejection, means to eject said pins, a receiver into which said pins are adapted to be ejected and means under control of the receiver for actuating the ejecting means.

PAUL SCHMIDT.